United States Patent
Hellmann et al.

(10) Patent No.: US 12,222,071 B2
(45) Date of Patent: Feb. 11, 2025

(54) COMPRESSED GAS STORAGE UNIT, AND VEHICLE COMPRISING A COMPRESSED GAS STORAGE UNIT

(71) Applicant: Robert Bosch GmbH, Stuttgart (DE)

(72) Inventors: Mark Hellmann, Korntal (DE); Markus Brenk, Remchingen (DE)

(73) Assignee: Robert Bosch GmbH, Stuttgart (DE)

( * ) Notice: Subject to any disclaimer, the term of this patent is extended or adjusted under 35 U.S.C. 154(b) by 31 days.

(21) Appl. No.: 18/018,138

(22) PCT Filed: Jul. 15, 2021

(86) PCT No.: PCT/EP2021/069830
§ 371 (c)(1),
(2) Date: Jan. 26, 2023

(87) PCT Pub. No.: WO2022/023063
PCT Pub. Date: Feb. 3, 2022

(65) Prior Publication Data
US 2023/0272885 A1    Aug. 31, 2023

(30) Foreign Application Priority Data
Jul. 30, 2020    (DE) ............ 10 2020 209 664.3

(51) Int. Cl.
*F17C 13/12*    (2006.01)
(52) U.S. Cl.
CPC ...... *F17C 13/12* (2013.01); *F17C 2201/0119* (2013.01); *F17C 2201/056* (2013.01);
(Continued)

(58) Field of Classification Search
CPC .............. F17C 13/12; F17C 2201/0119; F17C 2203/0607; F17C 2203/0619;
(Continued)

(56) References Cited

U.S. PATENT DOCUMENTS 2,677,938 A * 5/1954 Loveday ............... F17C 13/083
220/592.27
3,625,872 A * 12/1971 Ashida .................. C08K 3/016
528/48

(Continued)

FOREIGN PATENT DOCUMENTS

DE    102006009537 B3    5/2007
DE    102011114723 A1    4/2013
(Continued)

OTHER PUBLICATIONS

Translation of International Search Report for Application No. PCT/EP2021/069830 dated Oct. 22, 2021 (3 pages).

*Primary Examiner* — Rafael A Ortiz
(74) *Attorney, Agent, or Firm* — Michael Best & Friedrich LLP (57) ABSTRACT

A compressed gas storage unit (1) for mobile applications, in particular for storing hydrogen on board a vehicle, including at least one metal storage housing (2) which delimits a storage volume (3) that can be filled with compressed gas, as well as at least one temperature-and/or pressure-sensitive overload valve (4) arranged on the storage housing (2). The storage housing (2) or the compressed gas storage unit (1) is surrounded by a heat protection shield (5) at least in regions, preferably releasing the at least one overload valve (4).

13 Claims, 5 Drawing Sheets

(52) U.S. Cl.
CPC ............. *F17C 2203/0607* (2013.01); *F17C 2203/0619* (2013.01); *F17C 2203/0636* (2013.01); *F17C 2205/0111* (2013.01); *F17C 2205/0332* (2013.01); *F17C 2221/012* (2013.01); *F17C 2270/0178* (2013.01)

(58) Field of Classification Search
CPC ...... F17C 2203/0636; F17C 2205/0111; F17C 2221/012; F17C 2270/0178; F17C 2203/032; F17C 2203/03
USPC .......................................................... 220/586
See application file for complete search history.

(56) References Cited

U.S. PATENT DOCUMENTS

| | | | | |
|---|---|---|---|---|
| 5,005,362 | A | * | 4/1991 | Weltmer, Jr. ............ F17C 3/08 62/46.3 |
| 5,496,069 | A | * | 3/1996 | Milligan ................ B60K 15/03 280/832 |
| 5,822,838 | A | * | 10/1998 | Seal ..................... B29C 70/088 220/586 |
| 8,308,017 | B2 | * | 11/2012 | Schlag .................... F16J 12/00 220/586 |
| 10,267,459 | B2 | | 4/2019 | Schwartz |
| 2004/0040969 | A1 | | 3/2004 | DeLay et al. |
| 2008/0066805 | A1 | | 3/2008 | Winter et al. |
| 2010/0170906 | A1 | * | 7/2010 | Iida .................. H01M 8/04208 220/660 |
| 2011/0302933 | A1 | * | 12/2011 | Immel ...................... F17C 3/00 62/51.1 |
| 2014/0263358 | A1 | * | 9/2014 | Espinosa-Loza ....... F17C 13/06 220/560.04 |
| 2016/0076700 | A1 | * | 3/2016 | Uchida .................... F17C 1/16 220/586 |
| 2016/0109065 | A1 | * | 4/2016 | Coors ...................... F17C 1/00 156/185 |
| 2017/0167662 | A1 | * | 6/2017 | Schwartz ......... B60K 15/03006 |
| 2019/0226641 | A1 | | 7/2019 | Ogiwara et al. |
| 2020/0190793 | A1 | * | 6/2020 | Blunt ...................... E04C 2/296 |
| 2020/0191335 | A1 | * | 6/2020 | Kataoka ................. F17C 13/12 |
| 2020/0240587 | A1 | * | 7/2020 | Ogiwara ........... H01M 8/04776 |
| 2020/0256518 | A1 | * | 8/2020 | Adler ..................... F17C 13/12 |

FOREIGN PATENT DOCUMENTS

| | | | |
|---|---|---|---|
| DE | 102013016036 A1 | 3/2015 | |
| JP | 2011194952 A | 10/2011 | |
| JP | 2015175416 A | 10/2015 | |
| WO | WO-2016087233 A1 * | 6/2016 | ............ B60K 15/03 |
| WO | 2020185945 A1 | 9/2020 | |

* cited by examiner

COMPRESSED GAS STORAGE UNIT, AND VEHICLE COMPRISING A COMPRESSED GAS STORAGE UNIT

BACKGROUND

The invention relates to a compressed gas storage unit. The compressed gas storage unit is to be suitable in particular for mobile applications, for example for the storage of hydrogen on board a vehicle driven with the aid of fuel cells. The invention therefore relates further to a vehicle having a compressed gas storage unit according to the invention.

The storage of hydrogen in mobile applications, for example for operating a fuel cell electric vehicle, is technically demanding and represents a considerable cost factor. In principle, hydrogen can be stored cryogenically in so-called cryotanks or under pressure in one or more compressed gas containers. For applications in which it is not ensured that hydrogen is continuously removed, storage under pressure, that is to say in a compressed gas storage unit, represents the preferred solution.

In a compressed gas storage unit for hydrogen, the pressure can be up to 700 bar. The storage unit must therefore be designed for such high pressures. A container, or storage housing, made of metal, in particular steel, or of high-tensile carbon fibers is therefore generally chosen. Carbon fibers have the advantage that they are additionally particularly lightweight, so that a container manufactured therefrom has a very low weight, in particular compared to a steel container. However, the production of such a container is more complex and thus more expensive, so that steel containers are preferably used.

In order to provide hydrogen in a sufficient quantity on board a vehicle, a compressed gas storage unit generally comprises a plurality of compressed gas containers of the same type. The cost advantage accordingly increases with the number of containers.

In addition to the high storage pressure in a compressed gas storage unit, a temperature rise and thus a pressure rise in the compressed gas container, or in the compressed gas storage unit, can occur as a result of an input of heat from outside. The load on the individual compressed gas container, and thus the risk of bursting, increases in the same way. The safety requirements of a compressed gas storage unit are therefore correspondingly high. A compressed gas storage unit in which the pressure in the compressed gas containers is 700 bar, for example, is therefore designed for a bursting pressure of significantly above 1000 bar in order to comply with the safety requirements. For safety purposes, at least one temperature- and/or pressure-sensitive overload valve is additionally provided for each container, by means of which the pressure can be limited to a permissible maximum pressure. This is because, if the maximum pressure is reached, the valve opens and the pressure is thus relieved.

DE 10 2006 009 537 B3 discloses, for example, a compressed fuel-gas container having a pressure relief device which comprises a relief valve and a pressure signal line. In the event of a corresponding pressure signal, the relief valve is to open so that gas is able to escape from the compressed gas container. In this manner, bursting of the compressed gas container is to be prevented.

Starting from the prior art mentioned above, the object of the present invention is to provide a compressed gas storage unit for mobile applications, in particular for the storage of hydrogen on board a vehicle, which is designed for high pressures and at the same time has high temperature tolerance. In this manner, a compressed gas storage unit which meets high safety requirements is to be provided.

SUMMARY

The proposed compressed gas storage unit comprises at least one metal storage housing which delimits a storage volume which can be filled with compressed gas, and at least one temperature- and/or pressure-sensitive overload valve arranged on the storage housing. According to the invention, the storage housing or the compressed gas storage unit is surrounded at least in some regions by a heat shield, preferably while leaving the at least one overload valve free.

The purpose of the heat shield is to reduce the detrimental input of heat from outside to the inside, that is to say into the storage volume filled with compressed gas. In this manner, a temperature rise and thus a pressure rise in the storage housing is counteracted. As a result, the temperature tolerance of the individual storage housing, or of the compressed gas storage unit as a whole, thus increases.

The increased temperature tolerance of the proposed compressed gas storage unit makes it possible to use a metal storage housing, for example a storage housing made of steel. Metal storage housings generally do not have high temperature tolerance owing to the high thermal conductivity of metal, so that, without taking further safety precautions, they generally cannot be used in a compressed gas storage unit which must meet high safety requirements. However, metal storage housings have the advantage that high storage pressures are possible because metal, in particular steel, has high strength. In addition, the use of a metal storage housing is associated with a cost advantage, as mentioned at the beginning.

In the proposed compressed gas storage unit, the advantages of a metal storage housing come fully to bear. The disadvantage of low temperature tolerance is eliminated by the heat shield that is provided, so that the proposed compressed gas storage unit having at least one metal storage housing additionally meets the high safety requirements which are made of compressed gas storage units for mobile applications.

Preferably, the heat shield is or comprises a coating, a cladding and/or an enclosure.

The coating is applied directly to the outside of the storage housing and therefore requires no or only little additional installation space. A further advantage of the coating is that very good adhesion to the outside of the storage housing can be achieved. The coating can additionally easily be applied by spraying.

In the case of a cladding, this can likewise be arranged directly on at least one outer side of the storage housing so that the cladding is in direct contact with the storage housing. Alternatively, the cladding can be so arranged that a certain distance from the storage housing is maintained, for example in order to arrange a mounting which holds the cladding between the storage housing and the cladding. If the compressed gas storage unit comprises a plurality of storage housings, these can have a common cladding for forming the heat shield. That is to say, it is not necessary to equip each individual storage housing with its own heat shield, so that the outlay in terms of production and assembly falls. In this manner, installation space can at the same time be saved.

Alternatively or additionally, the heat shield can be or comprise an enclosure. The advantage of an enclosure is that it does not necessarily have to be adapted to the shape of the individual storage housing and consequently can have a simple, for example linear and/or angular, shape. Furthermore, a single enclosure can in a simple manner constitute a heat shield for a plurality of storage housings.

Preferably, the heat shield of the proposed compressed gas storage unit is made at least in part of a non-metallic material. This is because, unlike the storage housing, the heat shield does not have to meet any high requirements in terms of strength, because it is not subject to the high pressure in the storage volume. The function of the heat shield is completely different to that of the storage housing, namely to reduce the input of heat from outside. By splitting the functions between the storage housing and the heat shield, a functional choice of material can be made in each case. In relation to the heat shield, this means that a material with low thermal conductivity is preferably chosen so as to reduce the temperature conductivity of the heat shield.

The relationship between the thermal conductivity $\lambda$ and the temperature conductivity a is as follows:

$$a=\lambda/(\rho*c),$$

wherein "$\rho$" represents the density and "$c$" represents the specific heat capacity. The temperature conductivity a is accordingly design- and material-dependent. The heat shield of the compressed gas storage unit according to the invention preferably has a temperature conductivity a<1 W/(mK). This can be achieved, for example, by using a heat-insulating material, for example glass wool or rock wool, to form the heat shield.

It is further proposed that the metal storage housing of the compressed gas storage unit is substantially hollow cylindrical. A hollow cylindrical storage housing is suitable in particular for high storage pressures. The storage housing can have the shape of a bottle, for example. Alternatively or additionally, it is proposed that the storage housing has at least one dome-shaped end portion in the region of which the overload valve is arranged. That is to say, the overload valve is preferably arranged at an end face. This permits the parallel arrangement of a plurality of storage housings directly side by side and thus a tight "packing", which is advantageous for mobile applications.

The heat shield is preferably arranged in an outer circumferential region of the storage housing and extends over an angle range of at least 45°, preferably at least 90°, further preferably at least 120°. For example, the heat shield can be of wraparound form, that is to say can extend over the entire outer circumference, or 360°, of the storage housing. The placing of the heat shield depends, inter alia, on whether the compressed gas storage unit is to be protected from the input of heat from outside over a large area or only locally. A local input of heat can be caused in particular by a single heat source in the vehicle. If no further heat sources are additionally present, the protection can be locally limited. That is to say, the compressed gas storage unit is protected only partially by the heat shield. Because high temperatures can be reached by a single heat source in the vehicle, at least partial protection is necessary. In this case, the heat shield is formed or arranged at least where the input of heat is the greatest. This is because it is essential to prevent even only a local failure of the compressed gas storage unit.

An only local input of heat can be hazardous in particular when the location of the input of heat is far away from an overload valve that is thermally activated. This is because the local input of heat is then not detected or is detected too late. This risk can be counteracted with the aid of an at least partial heat shield.

Because a thermally activatable overload valve must be able to detect a hazardous external heat source, it is proposed that the heat shield is configured or arranged such that the at least one overload valve of the compressed gas storage unit remains free, that is to say is not covered by the heat shield. This is the case, for example, when the overload valve is arranged at an end face and the heat shield is arranged on the outer circumference.

However, the heat shield can additionally also be arranged in the region of an end face of the storage housing. If there is an overload valve in this region, the heat shield can be omitted there.

Preferably, the heat shield has an inner contour which is adapted to the outer contour of the storage housing. The heat shield can thus be configured or arranged in a very space-saving manner. Preferably, the heat shield has a constant thickness, so that the outer contour of the heat shield also follows the outer contour of the storage housing.

Further preferably, the heat shield is in contact with the storage housing over the entire surface. It is thereby ensured, for example in the event of a fire, that no flames pass between the storage housing and the heat shield and the storage housing is not exposed directly to flames.

The proposed compressed gas storage unit can comprise a plurality of storage housings, each of which is equipped with a heat shield. The number of storage housings can thus be varied as required without having to make changes to the heat shield.

The vehicle that is additionally proposed is distinguished in that it comprises a compressed gas storage unit according to the invention for the storage of hydrogen. Not only the compressed gas storage unit but also the vehicle thus meets high safety requirements. In addition, the at least one metal storage housing of the compressed gas storage unit permits high storage pressures. The vehicle can in particular be a fuel cell electric vehicle which, with the aid of fuel cells, converts hydrogen and oxygen into electrical energy so as to use this energy to drive an electric machine. In this case, the compressed gas storage unit is preferably part of a fuel cell system of the vehicle.

The compressed gas storage unit is arranged in the vehicle preferably such that the heat shield of the compressed gas storage unit is arranged at least in the region of an outer surface of the compressed gas storage unit that faces a heat source of the vehicle. That is to say, the heat shield is purposively placed where the input of heat from outside is the greatest. If further heat sources in the vehicle do not pose any risk, the heat shield can be limited to this region. However, the heat shield can also be larger. In addition, further heat shields can be provided.

BRIEF DESCRIPTION OF THE DRAWINGS

Preferred embodiments of the invention will be explained in greater detail hereinbelow with reference to the accompanying drawings, in which.

DETAILED DESCRIPTION

Figure 1:
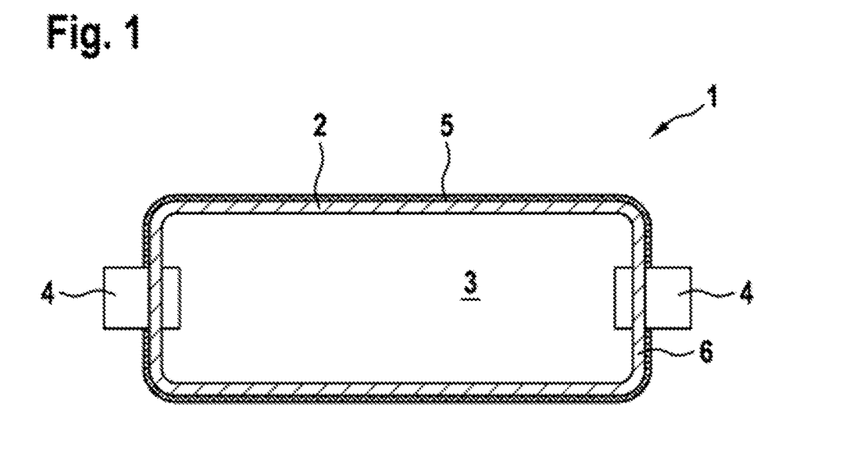
FIG. 1 is a schematic longitudinal section through a first compressed gas storage unit according to the invention.

A first compressed gas storage unit 1 according to the invention is shown in FIG. 1. It comprises a hollow cylindrical metal storage housing 2 which has a dome-shaped end portion 6 at each of its ends. An overload valve 4 is in each case arranged centrally in relation to the end portions 6.

The hollow cylindrical metal storage housing 2 delimits a storage volume 3 for holding a gas under pressure, in the present case hydrogen. Because the pressure in the storage volume 3 can be up to 700 bar, it is important to prevent or at least significantly reduce a temperature rise caused by an input of heat from outside, and a further pressure rise associated therewith. The storage housing 2 shown is therefore surrounded completely by a heat shield 5 in the form of a coating, while the two overload valves 4 are left free. The coating consists of a material which has a significantly reduced thermal conductivity compared to the metal of the storage housing 2, so that the temperature conductivity is lowered. Consequently, the storage housing 2 heats up to a significantly lesser extent as a result of an input of heat from outside.

Figure 2:
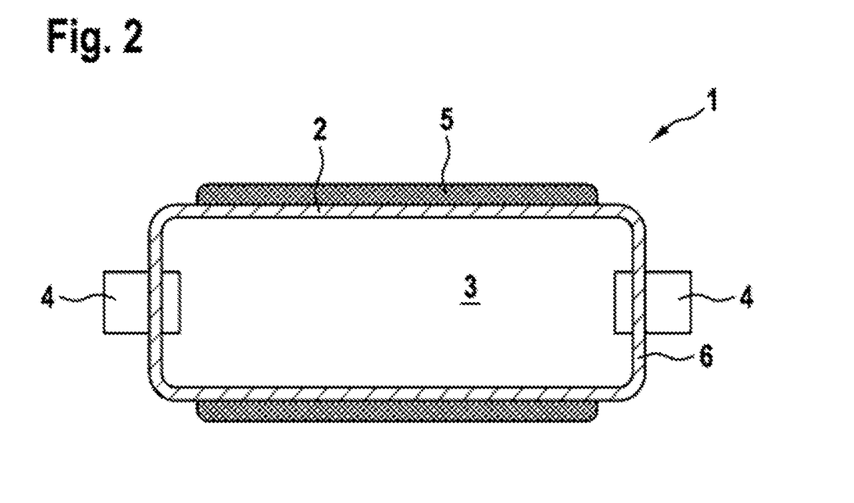
FIG. 2 is a schematic longitudinal section through a second compressed gas storage unit according to the invention.

FIG. 2 shows a further compressed gas storage unit 1 according to the invention, which differs from FIG. 1 in that the heat shield 5 is formed only partially. It leaves not only the two overload valves 4 but also the two end portions 6 free.

Figure 3:
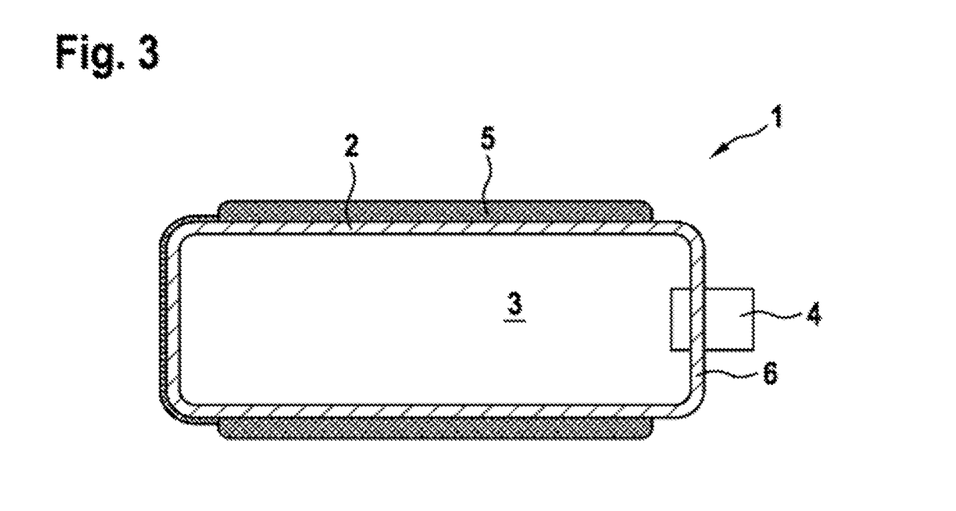
FIG. 3 is a schematic longitudinal section through a third compressed gas storage unit according to the invention.

Because the compressed gas storage unit 1 may also have only one overload valve 4, it is possible in this case to omit the heat shield 5 only in the region of the end portion 6 in which the overload valve 4 is optionally arranged. This embodiment is shown by way of example in FIG. 3.

Figure 4:
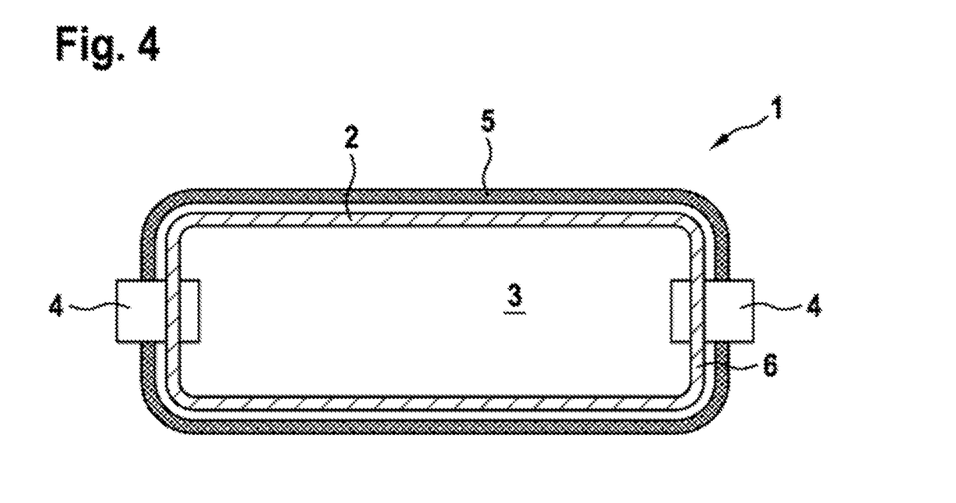
FIG. 4 is a schematic longitudinal section through a fourth compressed gas storage unit according to the invention.

FIG. 4 shows an embodiment of a compressed gas storage unit 1 according to the invention in which the heat shield 5 is formed by a cladding of the storage housing 2. The cladding encloses the storage housing completely—while leaving free two overload valves 4 each arranged at an end face.

Figure 5:
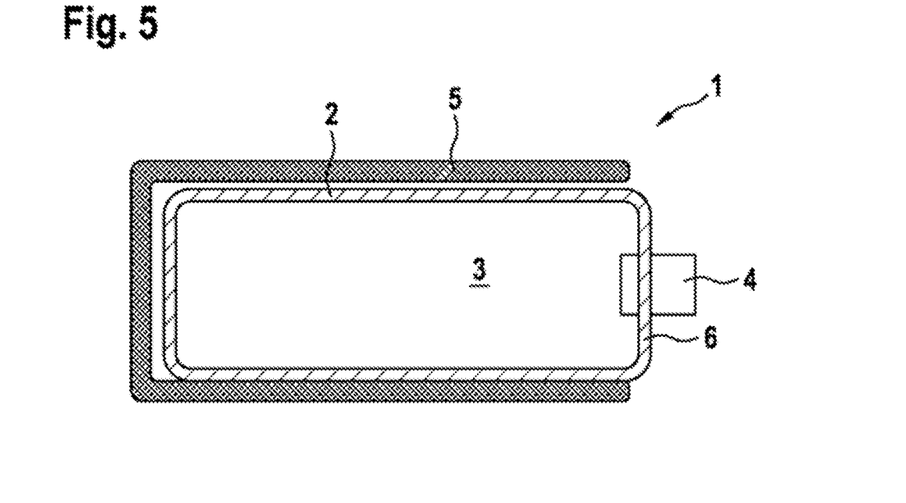
FIG. 5 is a schematic longitudinal section through a fifth compressed gas storage unit according to the invention.

FIG. 5 shows a variant with only one overload valve 4 arranged at an end face and an enclosure as the heat shield 5. Analogously to the exemplary embodiment of FIG. 3, the enclosure is omitted in the end portion 6 in which the overload valve 4 is arranged.

Figure 6:
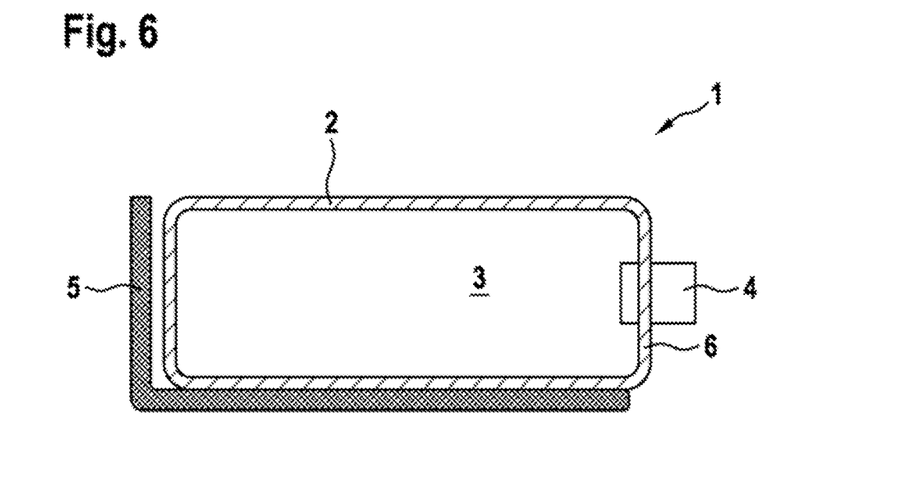
FIG. 6 is a schematic longitudinal section through a sixth compressed gas storage unit according to the invention.
Figure 7:
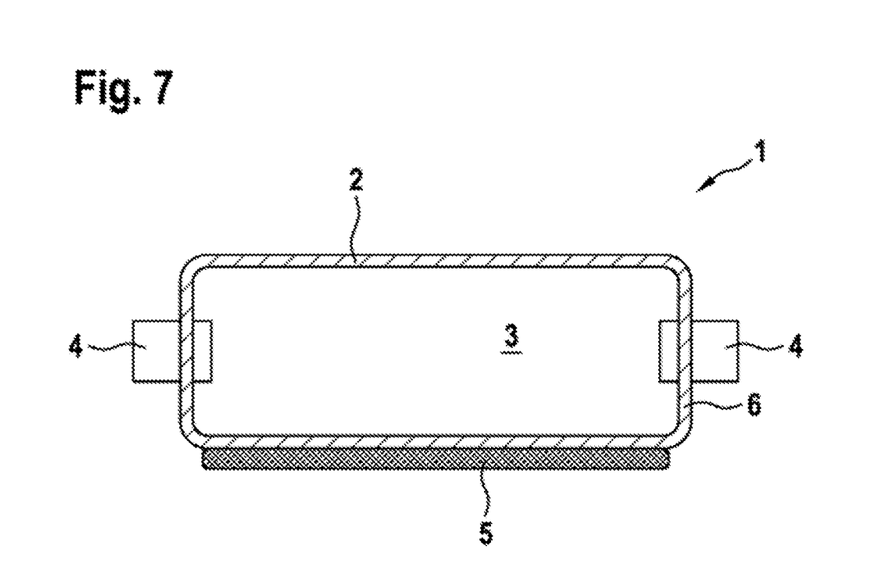
FIG. 7 is a schematic longitudinal section through a seventh compressed gas storage unit according to the invention.

As is shown in FIGS. 6 and 7, the enclosure can be further reduced so that only the regions that face a heat source in the concrete application are protected from an input of heat from outside.

Figure 8:
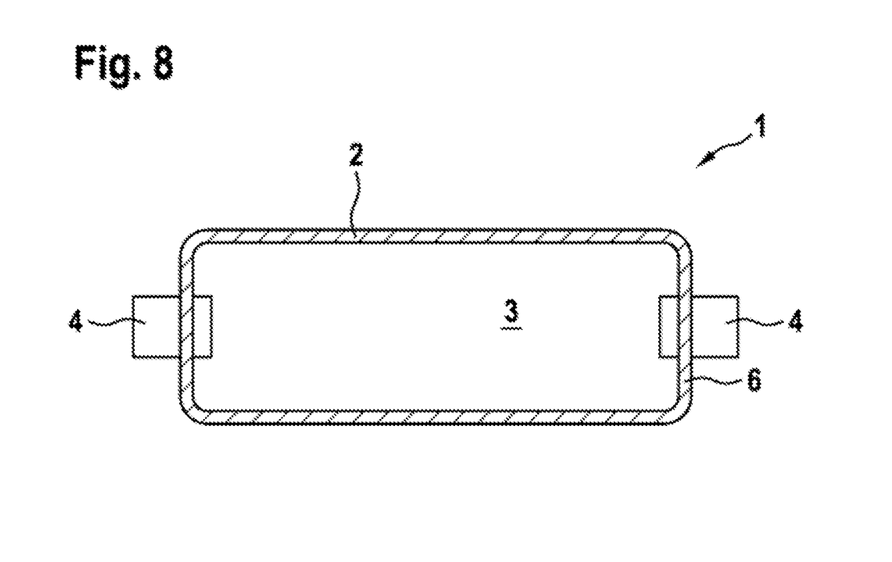
FIG. 8 is a schematic longitudinal section through a compressed gas storage unit known from the prior art.

FIG. 8 shows a conventional compressed gas container having a hollow cylindrical metal storage housing 2 and two overload valves 4 each arranged at an end face. Because of the absence of a heat shield 5, the compressed gas in the interior of the storage housing 2 can heat up as a result of an input of heat from outside and lead to a pressure rise, which is associated with an increased risk of bursting.

Figure 9:
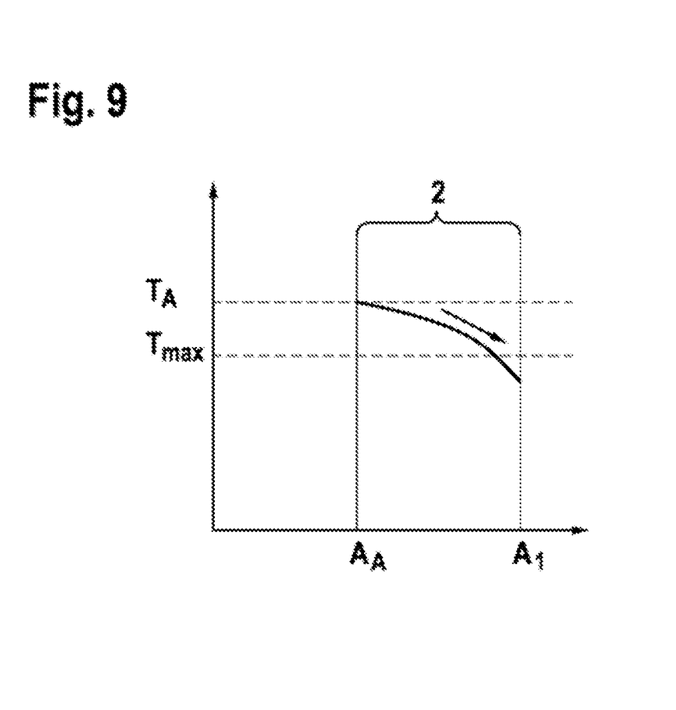
FIG. 9 is a diagram for graphically depicting the temperature profile in the wall of a storage housing of a compressed gas storage unit known from the prior art.

FIG. 9 shows by way of example the temperature profile in the wall of a storage housing 2 configured according to FIG. 8. The temperature $T_A$ at the outside surface $A_A$ falls only slightly across the thickness of the wall to the inside surface $A_I$, so that the compressed gas in the storage volume 3 heats up considerably. The temperature is therefore only just below the maximum permissible temperature $T_{max}$.

Figure 10:
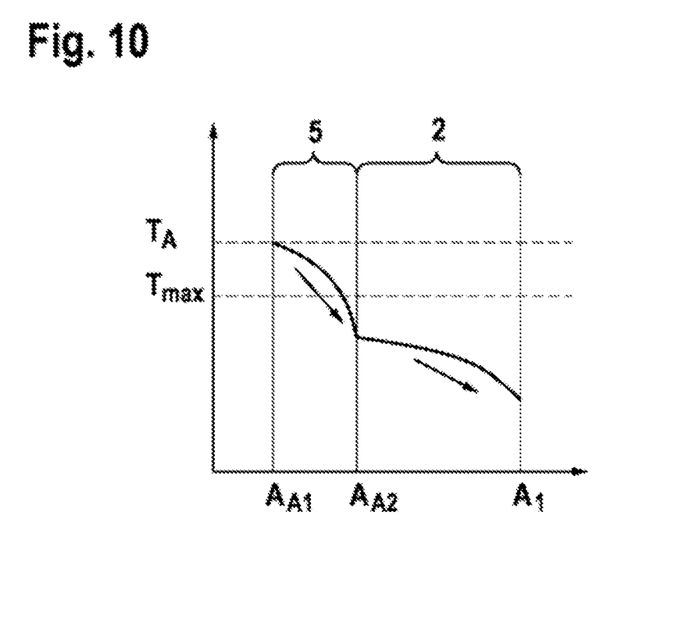
FIG. 10 is a diagram for graphically depicting the temperature profile in the wall of a storage housing of a compressed gas storage unit according to the invention.

In a compressed gas storage unit 1 according to the invention, a significant reduction in heating can be achieved with the aid of the heat shield 5. This is shown by way of example in FIG. 10. Owing to the poor thermal conductivity of the material of the heat shield 5, the temperature $T_A$ falls to a value below the maximum permissible temperature $T_{max}$ even outside the storage housing 2. The temperature measured at the outside surface $A_{A2}$ of the storage housing 2 is thus significantly below the temperature $T_A$ at the outside surface $A_{A1}$ of the heat shield 5. Because a further temperature drop is achieved across the wall of the storage housing 2, the temperature in the interior of the storage housing 2 is significantly below $T_{max}$.

What is claimed is:

1. A vehicle comprising a compressed gas storage unit (1) for the storage of compressed gas, the compressed gas storage unit (1) comprising at least one metal storage housing (2) which delimits a storage volume (3) which can be filled with compressed gas, and at least one temperature-sensitive and/or pressure-sensitive overload valve (4) arranged on the storage housing (2), wherein the storage housing (2) or the compressed gas storage unit (1) is surrounded at least in some regions by a heat shield (5), wherein the heat shield (5) of the compressed gas storage unit (1) is arranged at least in a region of an outer surface of the compressed gas storage unit (1) that faces a heat source of the vehicle.

2. The vehicle as claimed in claim 1, wherein the heat shield (5) comprises a coating, a cladding and/or an enclosure.

3. The vehicle as claimed in claim 1, wherein the heat shield (5) is made at least in part of a non-metallic material.

4. The vehicle as claimed in claim 1, wherein the storage housing (2) is substantially hollow cylindrical and/or has at least one dome-shaped end portion (6) in a region of which the overload valve (4) is arranged.

5. The vehicle as claimed in claim 1, wherein the heat shield (5) is arranged in an outer circumferential region of the storage housing (2) and extends over an angle range of at least 45°.

6. The vehicle as claimed in claim 1, wherein the heat shield (5) is arranged in a region of an end face of the storage housing (2).

7. The vehicle as claimed in claim 1, wherein the heat shield (5) has an inner contour which is adapted to an outer contour of the storage housing (2).

8. The vehicle as claimed in claim 1, wherein the compressed gas storage unit (1) stores hydrogen on board the vehicle.

9. The vehicle as claimed in claim 1, wherein the at least one overload valve (4) is not surrounded by the heat shield (5).

10. The vehicle as claimed in claim 3, wherein the non-metallic material has a temperature conductivity (a)<1 W/(mK).

11. The vehicle as claimed in claim 5, wherein, the heat shield extends over an angle range of at least 90°.

12. The vehicle as claimed in claim 11, wherein, the heat shield extends over an angle range of at least 120°.

13. The vehicle as claimed in claim 1, wherein, the heat shield (5) is arranged on an outermost surface of the compressed gas storage unit (1).

\* \* \* \* \*